No. 866,582. PATENTED SEPT. 17, 1907.
B. P. HANSON.
MANURE LOADER.
APPLICATION FILED JAN. 25, 1906. RENEWED JULY 19, 1907.
4 SHEETS—SHEET 1.
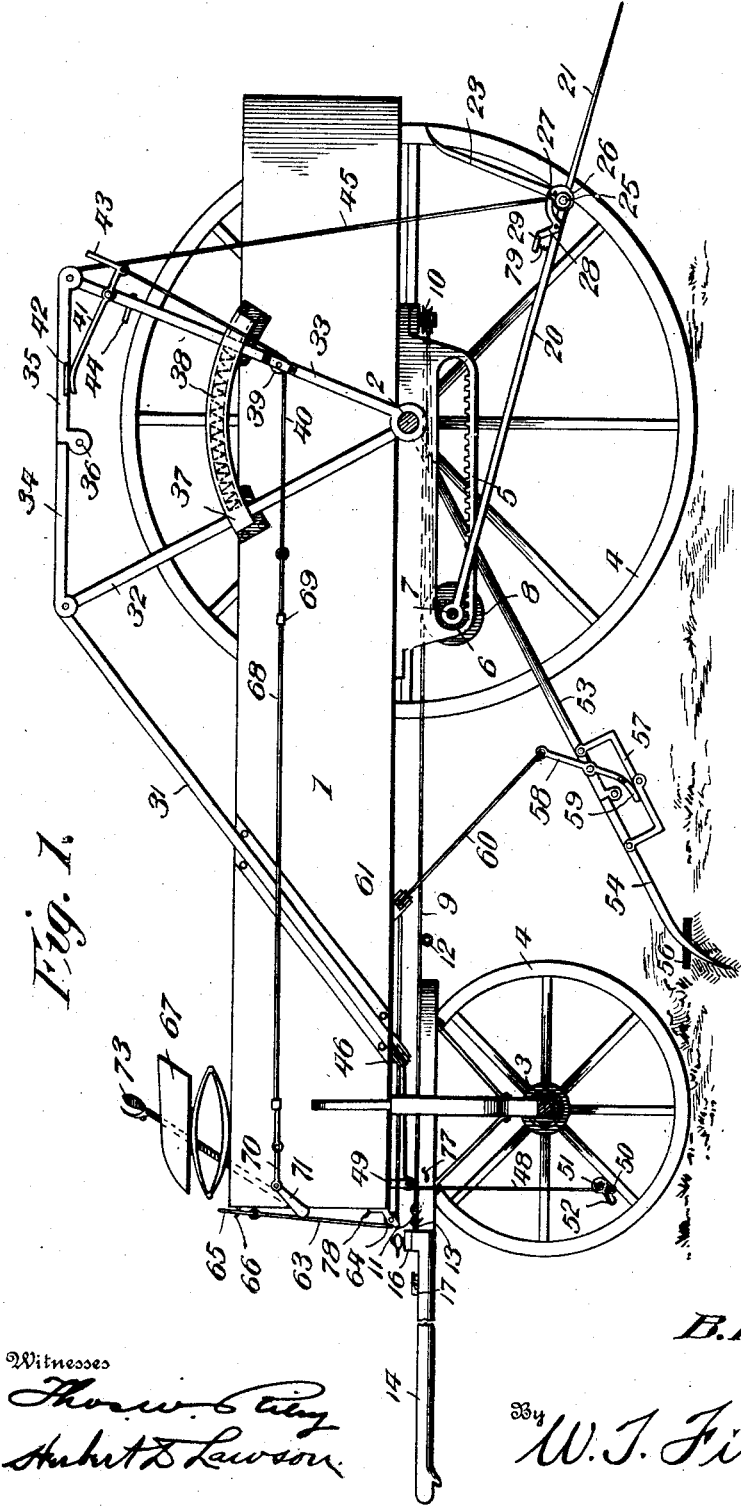
Witnesses
Inventor
B. P. Hanson.
By W. J. FitzGerald
Attorneys

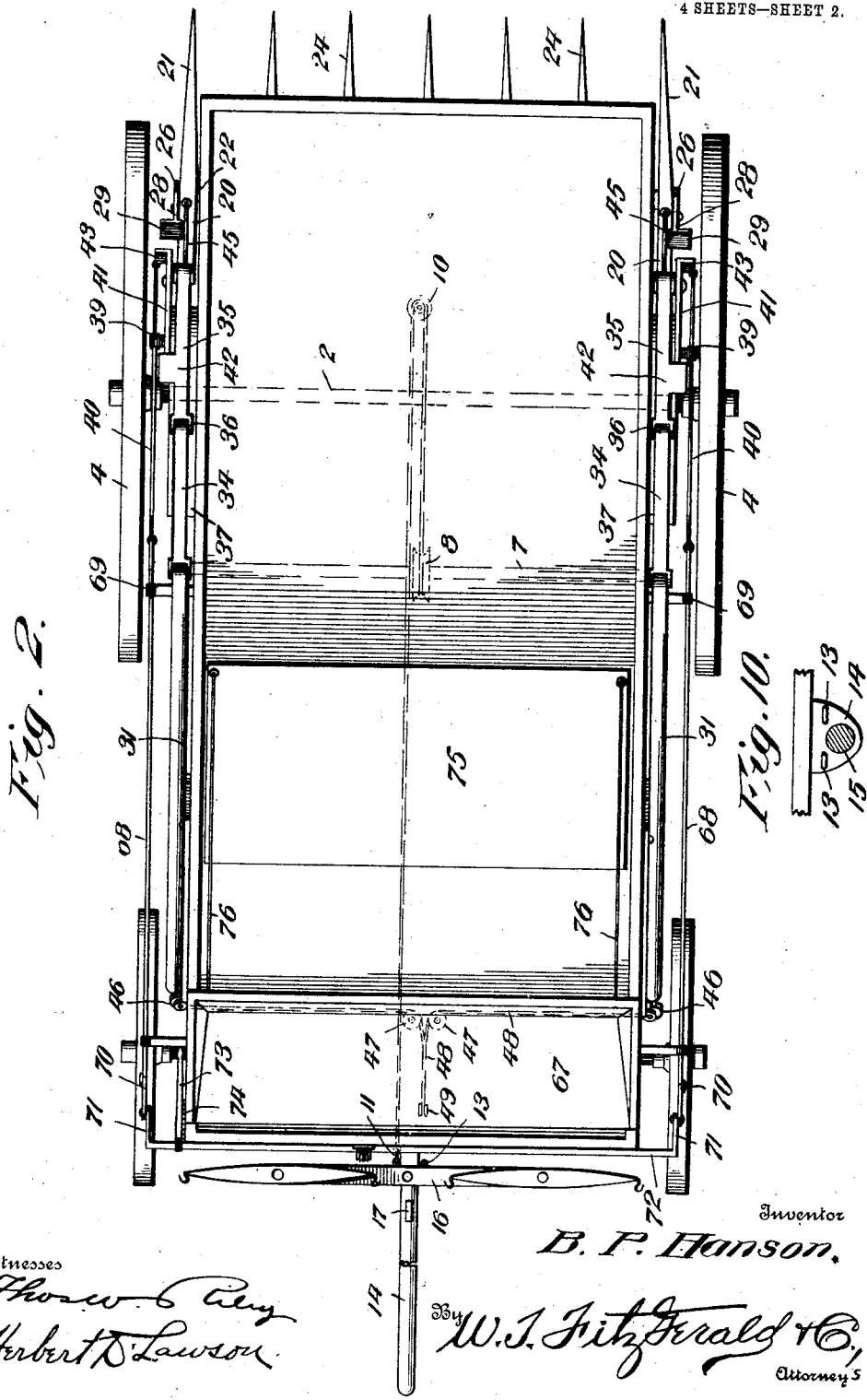

No. 866,582. PATENTED SEPT. 17, 1907.
B. P. HANSON.
MANURE LOADER.
APPLICATION FILED JAN. 25, 1906. RENEWED JULY 19, 1907.
4 SHEETS—SHEET 3.
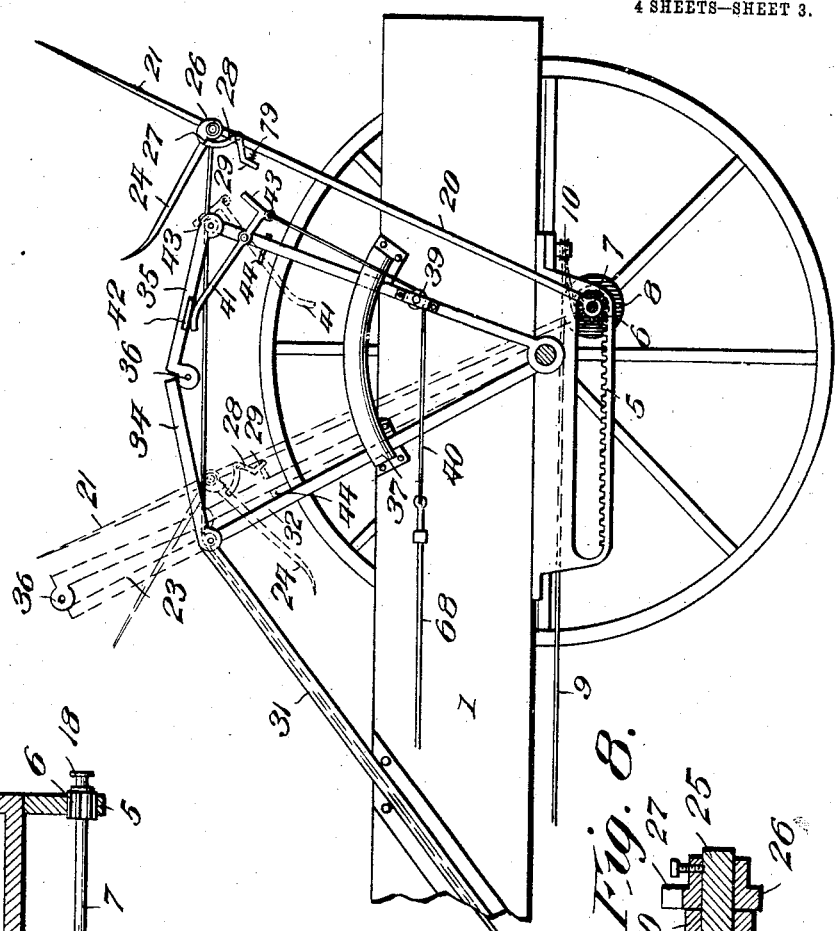
Witnesses
Inventor
B. P. Hanson.
By W. I. Fitzgerald & Co.
Attorneys No. 866,582. PATENTED SEPT. 17, 1907.
B. P. HANSON.
MANURE LOADER.
APPLICATION FILED JAN. 25, 1906. RENEWED JULY 19, 1907.
4 SHEETS—SHEET 4.
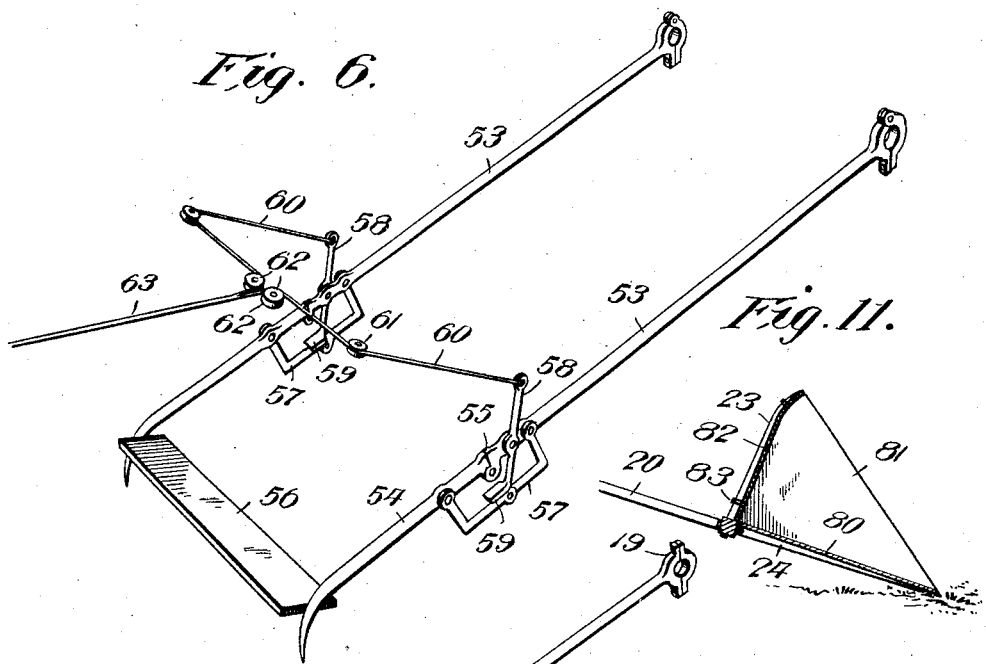
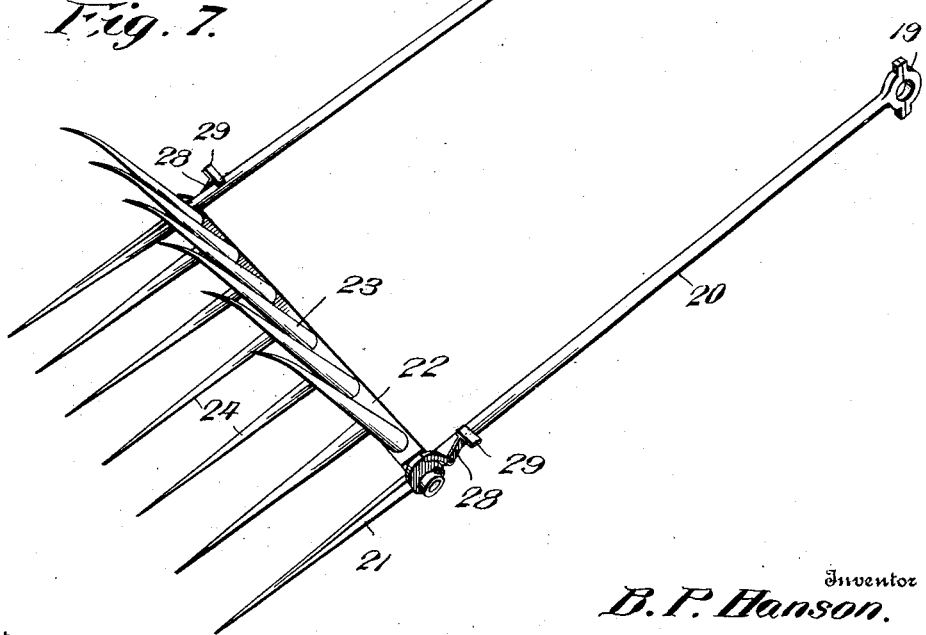
Witnesses
Inventor
B. P. Hanson.
By W. J. FitzGerald
Attorneys

UNITED STATES PATENT OFFICE.

BENNIE P. HANSON, OF PARKERSBURG, IOWA, ASSIGNOR OF ONE-HALF TO C. D. WILLIAMS, OF ELMORE, MINNESOTA.

MANURE-LOADER.

No. 866,582.   Specification of Letters Patent.   Patented Sept. 17, 1907.

Application filed January 25, 1906, Serial No. 297,860. Renewed July 19, 1907. Serial No. 384,608.

*To all whom it may concern:*

Be it known that I, BENNIE P. HANSON, a citizen of the United States, residing at Parkersburg, in the county of Butler and State of Iowa, have invented certain new and useful Improvements in Manure-Loaders; and I do hereby declare the following to be a full, clear, and exact description of the invention, such as will enable others skilled in the art to which it appertains to make and use the same.

My invention relates to manure loaders and its object is to combine with a wagon, mechanism for loading manure thereupon, said mechanism being operated by the horses used for drawing the wagon.

Another object is to provide mechanism which can be operated without necessitating the driver or operator leaving his seat upon the wagon.

A still further object is to provide means for evenly distributing the manure upon the wagon.

Another object is to provide means for holding the wagon against movement during the loading operation, said means being readily removed from operative position by the operator.

With the above and other objects in view, the invention consists of certain novel features of construction and combination of parts which will be hereinafter more fully described and pointed out in the claims.

In the accompanying drawings I have shown the preferred forms of my invention.

In said drawings—Figure 1 is a side elevation of a wagon having my improved loading mechanism connected thereto, the parts being shown in position immediately prior to engaging a manure pile. Fig. 2 is a plan view of the mechanism. Fig. 3 is a side elevation of the rear portion of the wagon and showing the positions assumed by the parts during the operation of hoisting the manure, one of the positions assumed by the fork when discharging manure on the wagon being shown by dotted lines. Fig. 4 is a transverse section through the wagon showing the drum, gears and their shaft for moving the fork into engagement with the manure. Fig. 5 is a perspective view showing in detail a portion of the fork and the means for holding it against movement. Fig. 6 is a perspective view of the wagon holding device and its operating mechanism. Fig. 7 is a similar view of the complete fork. Fig. 8 is an enlarged section through one end of the head of the fork and its bearing. Fig. 9 is an enlarged longitudinal section through the tongue of the wagon. Fig. 10 is a rear end view of the sleeve or tube mounted upon the pole, said pole being shown in section, and, Fig. 11 is a section showing an attachment adapted to be used in connection with the fork.

Referring to the figures by numerals of reference, 1 is the body of a wagon, the same being mounted in the ordinary manner upon axles 2 and 3 supported by traction wheels 4. Longitudinally disposed racks 5 are secured under the body 1 at the sides thereof and below the axle 2 and each of these racks is engaged by and supports a gear 6. The two gears are secured adjacent the ends of a shaft 7 extending transversely under the body 1 and this shaft has a drum 8 centrally disposed thereon to which is fastened a cable 9 which extends from the drum around a pulley 10 fastened to the bottom of the body 1 in rear of the racks 5. From this pulley 10 the cable 9 extends forward to the front portion of the wagon body where it is provided with a hook 11. A ring 12 or other like device extends from the cable at a point between its ends.

Hook 11 is adapted to be placed in engagement with an eye 13 extending rearwardly from a tube 14 which is slidably mounted upon a pole or rod 15 extending forward from the running gear of the wagon, and on this tube are secured whiffletrees 16 of the usual construction and arrangement. A spring catch 17 is mounted upon and extends into the tube 14 and is adapted to engage the pole 15 so as to normally lock said tube and pole together.

Shaft 7 projects laterally beyond both racks 5 and heads 18 are disposed upon the ends of said shaft and serve to loosely retain thereon split rings 19 located at the ends of parallel arms 20 which are spaced apart a sufficient distance to allow them to swing across opposite sides of the wagon body 1. These arms terminate at their free ends in integral tines 21 and journaled between the arms 20 at the base of said tines 21 is a cross bar 22 having two series of tines 23 and 24 respectively extending approximately at right angles to each other. The cross bar 22 has necks 25 which are rotatably mounted within the arms 20 and secured to these necks are collars 26 having shoulders 27 which are adapted to abut against a lock 28 in the form of a bell-crank lever. One of these levers is fulcrumed on each arm 20 and each lever has a laterally extending projection 29. It is of course obvious that when the two levers 28 abut against shoulders 27, they will hold the tines 23 and 24 in one position, and when said levers are disengaged from the shoulders 27, the tines will cause the cross bar 22 to rotate by gravity until the shoulders 27 come into contact with stop pins 30 extending from the arms 20.

Disposed upon the outer face of each side of the body 1 is a tube 31 which extends upwardly and rearwardly from the bottom of the wagon body and its upper end terminating at a point above the side of said body and being supported by an inclined brace 32 extending upward from the axle 2. Pivotally mounted upon the axle 2 upon opposite sides of the body 1 are arms 33 which are secured at their upper ends to the upper ends of the tubes 31 by means of links 34 and 35, said links being pivoted to the tubes 31 and arms 33 and being connected together by means of a knuckle-joint 36 whereby, when the parts are in their normal positions, said links 34 and 35 are disposed horizontally. A casing 37 is secured to each brace 32 and is curved from end to end, said casing being concentric with the axle 2. Each arm 33 bears against a spring 38 disposed within the adjoining casing 37 and it will therefore be obvious that any movement of the arms 33 toward braces 32 will cause the compression of springs 38. Each arm 33 has a pulley 39 journaled within it around which extends a cable 40, said cable being fastened at one end to a lever 41 pivoted to the upper portion of arm 33 and adapted to contact with a stop plate 42 extending from the link 35. An arm 43 projects upward from lever 41 and is for a purpose hereinafter set forth. A pin 44 is also slidably mounted in arm 33 and its function will be hereinafter set forth.

A cable 45 is secured to each arm 20 near the cross bar 22 and these cables extend over the joints between the arms 33 and links 35 and thence under said links 35 and 34 down through tubes 31. Pulleys 46 are located at the lower ends of the tubes 31 and the cables 45 extend under these pulleys and under the body 1 to the center of said body where they extend between pulleys 47 and are connected to form a single cable 48. This cable 48 is suspended from a pulley 49 and has an eye 50 at its free end and a block 51 movably mounted upon the cable. This block has a hook 52 extending from it adapted to be placed in engagement with the eye 13 hereinbefore referred to.

Pivotally connected to the axle 2 at points between racks 5 are parallel arms 53 having downwardly curved prongs 54 connected to their ends by knuckle-joints 55. These prongs are connected by a cross-strip 56 and are adapted to swing in unison upon their pivots. L-shaped arms 57 are pivoted to arms 53 and prongs 54 respectively and these arms 57 are like-wise pivoted together as shown in Figs. 1 and 6. A lever 58 is pivoted to each arm 53 between its arms 57 and the knuckle-joint 55 and said lever terminates in a foot 59 which contacts with arms 57 at their pivotal connection. The upper ends of the levers 58 have cables 60 secured to them and extending around pulleys 61 upon the bottom of the body 1 and thence under said body to the center thereof where they pass between pulleys 62 and are secured together to form a single cable 63 projecting forward and under a pulley 64 fastened to the front of the wagon body. This cable 63 terminates in a ring or hook 65 adapted to be placed in engagement with a hook 66 located on the body adjacent the drivers seat 67. The cables 40 hereinbefore referred to are fastened at their lower ends to rods 68 which are slidably mounted upon the sides of the wagon body within guides 69 and the forward ends of these rods are connected by means of links 70 with arms 71 extending from a shaft 72 journaled upon the front of the wagon body. A lever 73 is secured to this shaft adjacent one side of the wagon body and has a toothed rack or sector 74 and suitable means whereby the lever can be locked to said rack or sector.

A guiding board 75 is hinged within the wagon body near its forward end but in rear of the seat 67 and this board has actuating ropes 76 extending forward from it and by pulling on these ropes, the board 75 can be swung forward so as to direct under the seat any material which may accumulate upon the board.

Before the apparatus herein described is used for loading the body 1, the arms 20 and the fork tines supported thereby are held raised out of contact with the ground by placing the cable 48 in engagement with the hook 77 secured to the running gear in rear of pole 15. This cable is preferably connected to said hook by looping it therearound as shown in Fig. 1. The arms 53 and prongs 54 are likewise supported normally under the wagon body by looping the cable 60 over the hook 66.

When it is desired to load the body 1, the same is backed against the edge of a manure pile and cable 63 is released and its hook or ring 65 placed in engagement with hook 66. Prongs 54 will therefore drop into contact with the ground, their movement thereinto being limited by strip 56. Cable 48 is also released from hook 77 and therefore the tines 24 will drop by gravity upon the ground or upon the edge of the pile. The spring catch 17 is then released from pole 15 and the horses are driven forward. As the whiffletrees are connected to the tube 14, said tube will of course be slid along the pole 15 as the horses move forward and cable 9 will be drawn around pulley 10 and will unwind from the drum 8. This will result in said drum rotating and as gears 6 rotate with the drum, they will be caused to travel upon racks 5 and thereby move arms 20 and the fork tines thereon backward away from the wagon body and into the pile of manure. As soon as the gears 6 have traveled throughout the lengths of the racks, the cable 9 is fastened by placing the ring 12 thereon in engagement with a pin or hook 78 upon the end of the wagon body. Hook 11 is then released from the eye 13 on the end of the tube 14 and the horses are backed so as to draw tube or sleeve 14 back to its initial position. The eye 50 on the end of the cable 48 is then placed on hook 77 and the hook 52 extending from pulley 51 is placed within the eye 13. The horses are again driven forward after tube or sleeve 14 has been released from tongue 15 and cable 48 will therefore be drawn longitudinally and will cause the two cables 45 to travel within the tubes 31 and under the links 34 and 35, thereby swinging the arms 20 upward into the position shown in Fig. 3 and cause the tines to carry upward therewith any material which may have been engaged thereby. Should it be desired to dump said material upon the rear portion of the body 1, the forward movement of the horses is continued until the projections 29 on the locking levers 28 are brought into contact with the arms 43 on levers 41. Said locking levers 28 will therefore be tripped out of engagement with shoulders 27 and as the tines 23 and 24 are thus released, they will swing by gravity so as to drop the material supported by them upon the rear portion of the body 1.

Should it be desired to drop material upon the front portion of the wagon body, the lever 73 is swung forward so as to slide the rods 68 in their brackets and cause cables 40 to pull downward on levers 41. Said levers will therefore be swung upon their fulcrums and upward against the projections 42, thereby breaking the joints between links 35 and 34 and causing the arms 33 to swing over against braces 32 and said movement causing the compression of springs 38. The lever 73 is then locked to the rack 74 in the usual manner. The horses are then driven forward and arms 20 will swing around into the position shown by dotted lines in Fig. 3 and upon reaching the limit of their movement, the projections 29 on levers 28 come into contact with pins 44. Said levers 28 are therefore tripped as shown by dotted lines in Fig. 3 and the tines are caused to rotate so that the material supported thereby will be deposited upon the wagon body. It will be understood that the stop pins 30 will limit the rotation of the tines and their cross bars 22 in both instances where the locking lever 28 is tripped. After the manure has been dropped upon the front portion of the wagon body, the lever 73 is returned to its initial position so as to permit springs 38 to swing arms 33 backward and enable the links 34 and 35 to reassume their original positions. This movement of the arms 33 will swing the arms 20 past the center of gravity and the horses are then backed so as to permit the arms 20 to move downward. As the lower tines 24 are heavier than the upper tines, said tines will swing by gravity into their original positions after the arms 20 have been lowered to a predetermined point, and the locking levers 28 will automatically engage shoulders 27.
It will of course be understood that these locking levers 28 are provided with springs 79 so that the same will automatically engage the shoulders 27.

As the horses are backed to lower the arms 20 in the above described manner, the ring 12 is released from pin or hook 78 and therefore the weight of the arms 20 and the parts connected thereto will exert a forward pressure on shaft 7 and cause said shaft to reassume a position on the forward ends of racks 5, said movement of the shaft causing the rotation of the drum and the winding of cable 9 therearound. The parts are then in position to repeat the operations above described and after all of the material within reach of the tines has been elevated upon the body 1, the entire wagon can be backed nearer the pile and the operations continued until all of the manure has been gathered up. It is of course understood that the prongs 54 and strip 56 serve as a stop to prevent the forward movement of the wagon while the horses are moving forward and pulling on the cables 9 or 48.
It is not necessary to lift these prongs 54 from the ground when backing the wagon as they will automatically withdraw therefrom and reëngage the ground when the loading operation is continued. Whenever the loading operation is completed and it is desired to draw the wagon forward, the cable 63 is pulled upward. This will cause the levers 58 to swing on their fulcrums and break the joints between arms 57. The prongs 54 will therefore swing downward at an angle to arms 53 and said arms will be carried upward close to the body 1 so that the prongs 54 will be held clear of the ground. Cable 63 is then looped about hook 66 so as to support said parts.

In order to fill that portion of the body under the wagon seat, I utilize the board 75 and when manure has been dropped upon this board, the same is swung forward by pulling on ropes 76. The material upon the board will therefore be thrown under the seat and after the extreme forward end of the body has been filled in this manner, board 75 can be allowed to rets upon the bottom of the body 1 during the completion of the loading operation.

After the fork has been used for loading manure upon the wagon, a shovel, such as shown in Fig. 11, can be utilized for cleaning the ground of all remaining particles. This shovel may be of any desired construction, but is preferably formed of a sheet metal bottom 80 having integral side walls 81 and a back wall 82. The entire attachment is adapted to be placed upon and between the tines and secured thereon in any suitable manner as by means of loops 83. The bottom 80 of the attachment extends slightly beyond the tines 24 so that its edge may come into direct contact with the ground. The apparatus is adapted to be used in the same manner when this attachment is employed as when the same is not used.

It is to be understood that by the use of the term "fork" I do not wish to restrict myself to a fork *per se*, but the same is intended to cover any form of manure gathering device.

What I claim is:—

1. In a loader of the character described, the combination with a fork; of means adapted to be operated by the draft animals of the loader for projecting the fork rearwardly therefrom.

2. In a loader of the character described, the combination with a fork; of means adapted to be operated by the draft animals of the loader for projecting the fork rearwardly therefrom and for swinging said fork in a vertical plane.

3. In a loader, the combination with a vehicle body and means for securing draft animals thereto; of a fork connected to the body, means adapted to be operated by the draft animals for projecting the fork rearwardly from the body, and independently, similarly operated means for swinging said fork above the body.

4. In a loader of the character described, the combination with a vehicle, and draft appliances connected to and adapted to move away from the vehicle; of a fork, means operated by the draft appliances for moving the fork rearwardly from the vehicle, and independently, similarly operated means for swinging the fork above the vehicle.

5. The combination with a vehicle and draft appliances connected to the running gear thereof and adapted to move independently thereof; of a fork supported by the vehicle, means operated by the draft appliances for projecting the fork rearwardly from the vehicle, independently, similarly operated means for swinging the fork above the vehicle, and means for automatically releasing material from the fork when in raised position.

6. The combination with a vehicle and draft appliances connected to but movable independently of the running gear of the vehicle; of parallel arms supported by the vehicle, a fork rotatably mounted between the arms, means for locking said arms against rotation, means operated by the draft appliances for swinging the fork above the vehicle, and means for automatically releasing the fork when in raised position.

7. The combination with a vehicle; of an arm supported thereby, a fork rotatably mounted on the arm, a device for locking the fork against rotation, means for swinging said fork above the vehicle, and adjustable means for automatically tripping the device at a predetermined point above the vehicle.

8. The combination with a vehicle; of an arm supported thereby, a fork movably connected to the arm, a locking device for holding the fork against movement, means for swinging the fork above the vehicle, a tripping device for automatically unlocking the fork when above the vehicle, and manually operated means for adjusting said device to predetermined points above the vehicle.

9. The combination with a vehicle, of an arm supported thereby, a fork movably connected to the arm, a locking device for holding the fork against movement, means for swinging the fork above the vehicle, a tripping device for automatically unlocking the fork when above the vehicle, manually operated means for adjusting said device to predetermined points above the vehicle, and means for automatically returning the tripping device to its initial position.

10. The combination with a vehicle having a longitudinally disposed rack thereon; of a gear meshing with the rack, an arm carried by the gear, means for rotating the gear to project the arm rearwardly from the vehicle, and a fork connected to the arm.

11. The combination with a vehicle having a rack secured thereto; of a shaft disposed above the rack, a gear thereon meshing with the rack, a fork connected to the shaft, and means for rotating the shaft and gear to project the fork beyond the vehicle.

12. The combination with a vehicle having draft appliances connected to and movable longitudinally, independently of the running gear of the vehicle; of a fork supported by the vehicle, and means operated by the movement of the draft appliances in one direction for projecting the fork in the opposite direction.

13. The combination with a vehicle having a longitudinally disposed rack thereon; of a shaft extending above the rack, a gear thereon meshing with the rack, a flexibly supported fork movable with the shaft, draft appliances secured to and movable longitudinally, independently of the running gear of the vehicle, and means operated by the longitudinal movement of said appliances for rotating the gear.

14. The combination with a vehicle having a longitudinally disposed rack thereon; of a shaft extending above the rack, a gear thereon meshing with the rack, a flexibly supported fork movable with the shaft, draft appliances secured to and movable longitudinally, independently of the running gear of the vehicle, means operated by the longitudinal movement of said appliances for rotating the gear, and similarly operated means for swinging the fork above the vehicle subsequent to said movement of the gear.

15. The combination with a vehicle having a longitudinally disposed rack thereon; of a shaft above the rack, a gear upon the shaft, and meshing with the rack, an arm extending from and pivoted upon the shaft, a fork rotatably mounted upon the arm, a locking device for holding the fork against rotation, draft appliances connected to and movable longitudinally, independently of the running gear of the vehicle, means operated by the longitudinal movement of said appliances for rotating the gear upon the rack, similarly operated means for swinging the arm and fork above the vehicle, and means for automatically tripping the fork-locking device when the fork is raised.

16. The combination with a vehicle having a longitudinally disposed rack thereon; of a shaft above the rack, a gear upon the shaft, and meshing with the rack, an arm extending from and pivoted upon the shaft, a fork rotatably mounted upon the arm, a locking device for holding the fork against rotation, draft appliances connected to and movable longitudinally, independently of the running gear of the vehicle, means operated by the longitudinal movement of said appliances for rotating the gear upon the rack, similarly operated means for swinging the arm and fork above the vehicle, means for automatically tripping the fork-locking device when the fork is raised, and manually operated mechanism for adjusting the tripping means to predetermined points above the vehicle.

17. The combination with a vehicle having draft appliances connected to and movable longitudinally, independently of the running gear; of a fork supported by the vehicle, means operated by the forward movement of the draft appliances for projecting the fork rearwardly from the vehicle, and a ground engaging device depending from the vehicle for preventing forward movement thereof.

18. The combination with a vehicle having draft appliances connected to and movable longitudinally, independently of the running gear; of a fork supported by the vehicle, means operated by the forward movement of the draft appliances for projecting the fork rearwardly from the vehicle, and means depending from the vehicle for preventing forward movement thereof, said means comprising a pivoted arm, a ground engaging device movably connected thereto, and manually operated means for raising said device from the ground.

19. The combination with a vehicle having draft appliances connected to and movable longitudinally, independently of the running gear; of a fork supported by the vehicle, means operated by the forward movement of the draft appliances for projecting the fork rearwardly from the vehicle, and means pivoted to and depending from the vehicle for preventing forward movement thereof, said means comprising an upper arm, a ground engaging prong pivoted thereto, arms pivoted together and to the prong and to the said upper arm, a lever fulcrumed upon the upper arm and bearing upon the pivoted arms, and means for manually operating the lever to break the joint between the prong and arm and to disengage the prong from the ground.

20. The combination with a vehicle having draft appliances connected to and movable longitudinally, independently of the running gear; of a fork supported by the vehicle, means operated by the forward movement of the draft appliances for projecting the fork rearwardly from the vehicle, and means connected to and depending from the vehicle for preventing forward movement thereof, said means comprising pivoted arms and prongs movably connected thereto, a stop strip connecting the prongs, and manually operated means for breaking the joints between the arms and prongs and for raising them.

21. The combination with a vehicle having a rearwardly extending fork connected thereto and depending therefrom; of a pole extending from the running gear of the vehicle, a sleeve slidably mounted upon the pole, draft appliances connected to the sleeve, means for locking the sleeve and pole against independent longitudinal movement, and mechanism connecting the sleeve and fork whereby the same may be moved in opposite directions simultaneously.

22. The combination with a vehicle having rearwardly movable swinging arms depending therefrom, a rotatable fork mounted between the arms, and a lock therefor; of braces extending upward from the vehicle, swinging arms mounted upon the vehicle, pivotally connected links interposed between and secured to the braces and arms, lock-tripping devices upon the arms, and manually operated means for breaking the joints between the links and swinging the arms and their tripping devices toward the braces.

23. The combination with a vehicle having rearwardly movable, swinging arms depending therefrom, a rotatable fork mounted between the arms, and a lock therefor; of braces extending upward from the vehicle, swinging arms mounted upon the vehicle, pivotally connected links interposed between and secured to the braces and arms, lock-tripping devices upon the arms, manually operated means for breaking the joints between the links and swinging the arms and their tripping devices toward the braces, and means for automatically returning the arms to their initial positions when released.

24. The combination with a vehicle having inclined, tubular guides extending therefrom, and braces for said guides; of arms pivoted to and extending above the vehicle, pivotally connected links interposed between and connecting the arms and braces, rearwardly movable arms supported by the vehicle, a fork rotatably mounted between the arms, a lock for the fork, means extending from the arms and through the guides for swinging the fork above the vehicle, lock-tripping devices upon the arms, and means for breaking the joints between the links and swinging the arms toward the braces.

25. The combination with a vehicle having inclined tubular guides extending thereabove; of rearwardly movable, swinging arms supported by the vehicle, a fork rotatably mounted between the arms, a lock for holding the fork against rotation, braces for the guides, flexible devices extending through the guides for swinging the arms above the vehicle, and adjustable means for tripping the lock at predetermined points above the vehicle.

26. The combination with a vehicle having a movable board therein and means for swinging said board toward one end of the vehicle; of swinging arms supported by the vehicle, a fork mounted between the arms, and means for swinging the fork above the vehicle and depositing material upon the board.

27. The combination with a vehicle having a movable board therein and means for swinging the board toward one end of the vehicle; of swinging arms supported by the vehicle, a fork rotatably mounted between the arms, means for locking the fork against rotation, mechanism movable independently of the vehicle for swinging the fork above the vehicle, and a tripping device for releasing the fork to deposit material upon the board.

28. In a device of the character described, a gathering device comprising parallel arms, a cross bar rotatably mounted therebetween, tines extending from the bar, and means upon one of the arms for locking the bar and tines against rotation.

29. In a device of the character described, a gathering device comprising parallel arms, a bar rotatably mounted therebetween, series of tines extending from the bar at an angle to each other, and means upon one of the arms for locking the bar and tines against rotation.

30. In a device of the character described, a gathering device comprising parallel arms, a bar rotatably mounted therebetween, series of tines extending from the bar at an angle to each other, a shouldered collar rotatable with the bar, and means upon one of the arms for engaging said collar to hold it against rotation.

31. In a device of the character described, a gathering device comprising parallel arms, a fork rotatably mounted therebetween and consisting of two series of tines disposed at an angle to each other, and a shovel-like attachment interposed between and secured to the series of tines.

In testimony whereof I have signed my name to this specification in the presence of two subscribing witnesses.

BENNIE P. HANSON.

Witnesses:
W. T. EVANS,
T. W. CONN.